United States Patent [19]
Tsuoka

[11] Patent Number: 5,819,287
[45] Date of Patent: Oct. 6, 1998

[54] DATABASE DRIVEN AUTOMATIC PROGRAM PRODUCTION SYSTEM

[75] Inventor: Hideaki Tsuoka, Tokyo, Japan

[73] Assignee: NEC Corporation, Tokyo, Japan

[21] Appl. No.: 681,993

[22] Filed: Jul. 30, 1996

[51] Int. Cl.⁶ .................................................. G06F 17/30
[52] U.S. Cl. .......................... 707/104; 707/102; 395/500
[58] Field of Search .............. 395/500, 200.56, 395/183.09; 455/158.5; 370/351; 707/104, 102

[56] References Cited

U.S. PATENT DOCUMENTS

| | | | |
|---|---|---|---|
| 5,269,014 | 12/1993 | Ogino | 395/500 |
| 5,408,619 | 4/1995 | Oran | 395/325 |
| 5,689,645 | 11/1997 | Schettler et al. | 395/200.1 |
| 5,694,578 | 12/1997 | Upson et al. | 395/500 |
| 5,720,007 | 2/1998 | Hekmatpour | 395/54 |
| 5,720,032 | 2/1998 | Picazo, Jr. et al. | 395/200.2 |
| 5,732,388 | 3/1998 | Hoege et al. | 704/205 |

FOREIGN PATENT DOCUMENTS

| | | |
|---|---|---|
| 5-270139 | 5/1995 | Japan . |
| 7-121363 | 5/1995 | Japan . |

OTHER PUBLICATIONS

Generic Lifecycle Support in the ALMA Environment, Van Lamsweerde et al., IEEE transactions on Software Engineering, vol. 14, No. 6, Jun. 1988.

*Primary Examiner*—Paul V. Kulik
*Assistant Examiner*—Shahid Alam
*Attorney, Agent, or Firm*—Foley & Lardner

[57] ABSTRACT

A database driven automatic program production system which can change the structure of a driving database without having an influence on an existing program produced by a user. A program execution system which has driving database 4, feature program 6 and call processing program 5 and executes a computer program by driving the database includes driving database structure definition file 7, program structure definition file 1, feature definition file 2 and conversion program 3 which produces contents of driving database 4. In this case, conversion program 3 can input driving database structure definition file 7, program structure definition file 1 and feature definition file 2. In order to change the contents of driving database 4, contents of feature definition file 2 or conversion program 3 are changed, and driving database 4 and program structure definition file 1 can have a relationship wherein they are independent of each other.

3 Claims, 4 Drawing Sheets

DATABASE DRIVEN AUTOMATIC PROGRAM PRODUCTION SYSTEM

BACKGROUND OF THE INVENTION

1. Field of the Invention

This invention relates to a computer programming system, and more particularly to a database driven programming system.

2. Description of the Related Art

As a typical example of the prior art of a database driven program system, there is an invention "Database Driven Program Execution System" disclosed in Japanese Patent Laid-open No. 121363/95. In the program execution system, programming signifies changing parameters of a database.

A system which makes use of the program execution system of the prior art makes it possible, when realizing the various services defined in an intelligent network by the driving of a database, for a user to execute the addition of a new service to the system, the addition of functions of an existing service and change of functions of an existing service readily by merely changing parameters of the database without changing source codes.

In the program execution system described above, however, in order to satisfy various demands of many users, the database structure gradually becomes complex and advanced. Consequently, when changing parameters of a database, an operation more complex than describing source codes of a program tends to be required of a user. Further, also when it becomes necessary to change the database structure as a result of a user's requirement to add new functions, a changing of the database structure cannot readily satisfy the user's requirement, which is another problem of the program execution system. Furthermore, if the structure of a database as an object of driving is changed, a user must change parameters of the database based on the change in structure, and therefore, a program produced by the user must be changed. Consequently, the program execution system has a further problem in that, as the scale of the system increases, considerably more time is required for a user to change the program.

SUMMARY OF THE INVENTION

It is an object of the present invention to provide a database driven automatic program production system which can change the structure of a driving database without having an influence on an existing program produced by a user.

In order to achieve the object described above, a database driven automatic program production system of the present invention, is a program execution system which has a driving database, a feature program and a call processing program and executes a computer program by driving the database and includes a file (hereinafter referred to as driving database structure definition file) which defines a driving database structure, another file (hereinafter referred to as program structure definition file) which defines a program structure, a further file (hereinafter referred to as feature definition file) which defines a feature to be described in the driving database, and a conversion program which produces contents of the driving database.

In the database driven automatic program production system of the present invention described above, the conversion program may receive as inputs thereto the driving database structure definition file, the program structure definition file and the feature definition file.

Further, in the database driven automatic program production system of the present invention described above, when the contents of the driving database are to be changed, the contents of at least one of the feature definition file and the conversion program may be changed, and the driving database and the program structure definition file may have a relationship wherein they are independent of each other.

The system of the present invention comprises the driving database structure definition file, the program structure definition file, the feature definition file, and the conversion program which receives as inputs thereto the driving database structure definition file, the program structure definition file, and the feature definition file, and produces contents of the driving database. And, the contents of the driving database are changed by changing the feature definition file and/or the conversion program, and the driving database and the program structure definition file are independent of each other. Consequently, the user can separate the program structure definition file from the driving database structure and perform programming. Further, even if the driving database structure has been changed to add functions to meet a new requirement of the user, the database structure can be changed just by changing the feature definition file or the conversion program and the functions can be added without altering the existing program structure definition file made by the user.

Further, even if feature programs are added, modification to the program structure definition file produced by the user is unnecessary.

Furthermore, the program structure is checked by the functions of the conversion program and change in the driving data base structure is absorbed inside, suppressing influence on the program structure definition file.

From the foregoing, also the knowledge required for production of a program is simplified by use of the feature definition file and the conversion program. Consequently, the time required for production of and/or modification to a program is reduced.

Further, it is possible for the user to produce a program prior to designing of the driving database. Consequently, the period required for development of a program is reduced.

The above and other objects, features, and advantages of the present invention will become apparent from the following description based on the accompanying drawings which illustrate an example of a preferred embodiment of the present invention.

DETAILED DESCRIPTION OF THE PREFERRED EMBODIMENT

An embodiment of the present invention will be described below with reference to the drawings.

Figure 1:
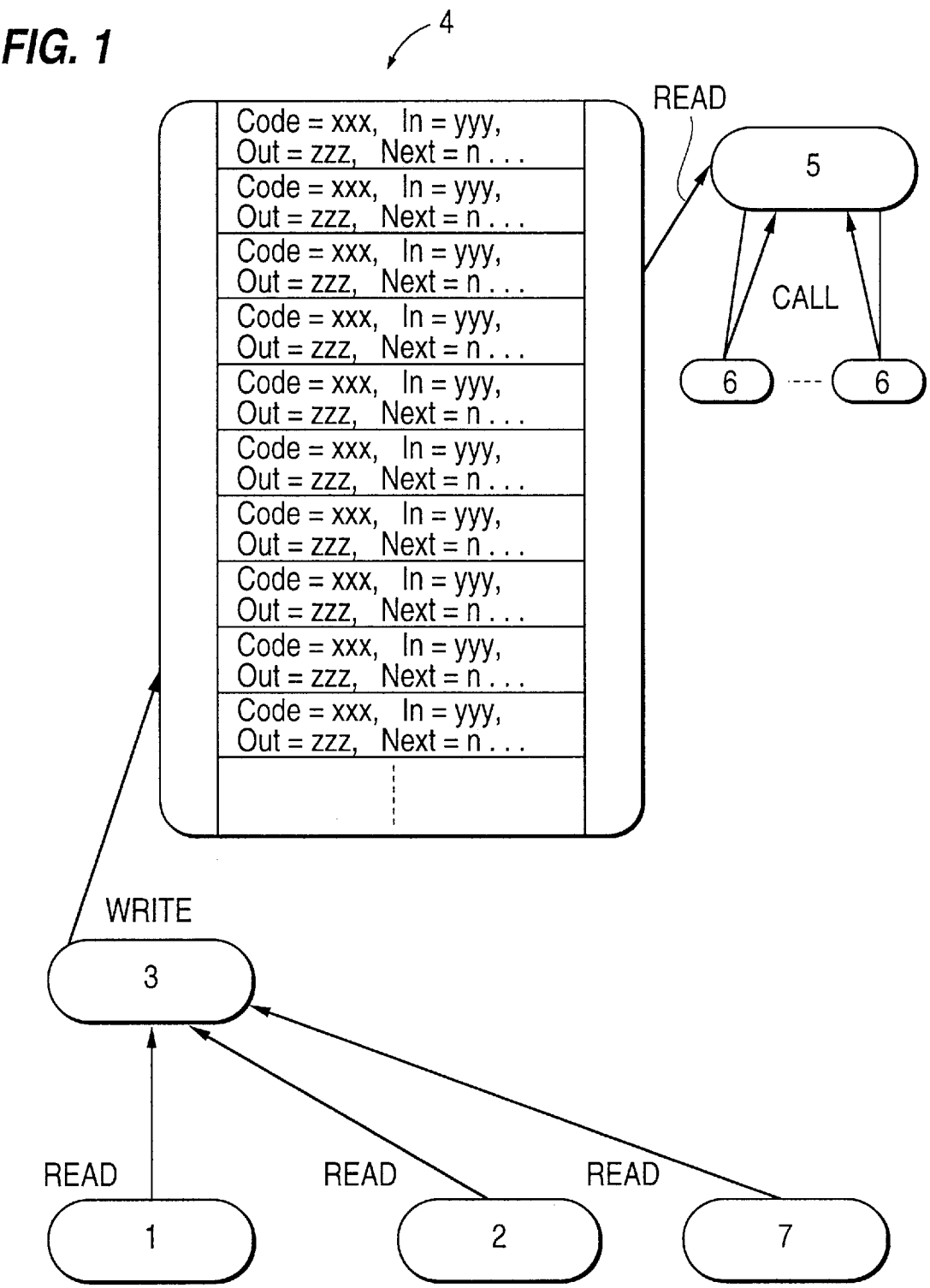
FIG. 1 is a block diagram showing a call processing program system in an intelligent network system in an embodiment of the present invention.

FIG. 1 is a block diagram showing a call processing program system in an intelligent network system in an embodiment of the present invention.

The call processing program system shown in FIG. 1 has program structure definition file 1 produced by a user, feature definition file 2, conversion program 3, driving database 4, call processing program 5, a plurality of feature programs 6 and driving database structure definition file 7.

Program structure definition file 1, feature definition file 2 and driving database structure definition file 7 which defines a structure scheme of driving database 4 are inputted to conversion program 3. A predetermined record of driving database 4 is rewritten by conversion program 3.

If a call connection request is detected by call processing program 5, then driving database 4, which is to be executed next, is determined. A first record of the determined driving database 4 is read into call processing program 5. A plurality of driving databases 4 may be determined in this case. A feature name and a call parameter are described in the driving database record read into call processing program 5. Feature program 6, which corresponds to a designated feature described in the driving database record, is called with the designated call parameter into call processing program 5. A result of the call of feature program 6 is analyzed by call processing program 5 to determine a driving database record to be executed next. Call processing program 5 ends the call processing when no described data remains in driving database 4 or when end data is read out from driving database 4.

Figure 2:
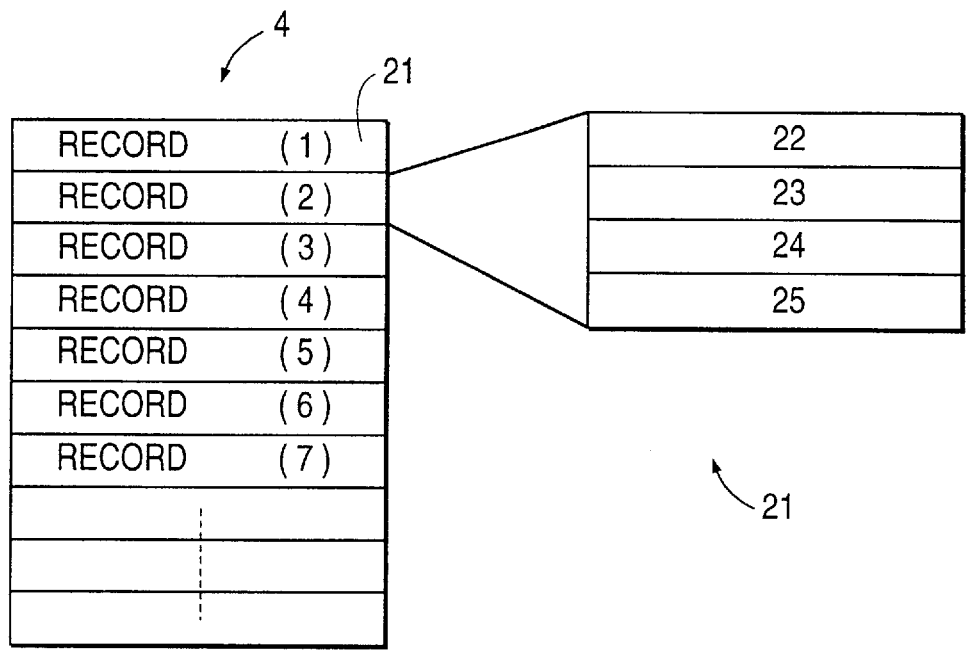
FIG. 2 is a diagrammatic view showing the structure of a driving database shown in FIG. 1.

FIG. 2 is a diagrammatic view showing the structure of the driving database shown in FIG. 1. Driving database 4 shown in FIG. 2 has a plurality of driving database records 21. Driving database 4 is produced by conversion program 3 shown in FIG. 1. Each driving database record 21 of driving database 4 has feature name 22, table of input data 23 indicative of an input parameter group, table of output data 24 indicative of an output parameter group, and table of record number for next execution 25 indicative of driving database record 21 to be referred to next in accordance with a return value of a feature. This driving database record 21 is read into call processing program 5 described hereinabove referring to FIG. 1. Further, each of table of input data 23, table of output data 24 and table of record number for next execution 25 corresponds to a call parameter described hereinabove referring to FIG. 1.

The structure of driving database record 21 is not limited to that described above, and driving database record 21 may have any other structure depending upon object processing.

Figure 3:
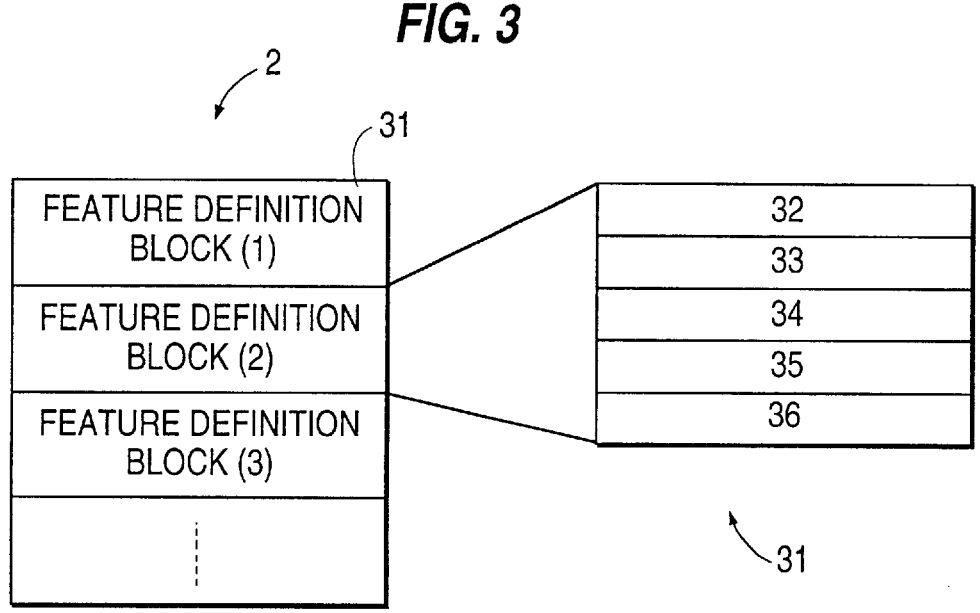
FIG. 3 is a diagrammatic view showing the structure of a feature definition file shown in FIG. 1.

FIG. 3 is a diagrammatic view showing the structure of the feature definition file shown in FIG. 1. Feature definition file 2 shown in FIG. 3 has a plurality of feature definition blocks 31. Feature definition file 2 is referred to by conversion program 3 shown in FIG. 1. Each feature definition block 31 of feature definition file 2 has feature name 32, feature explanation 33 that explains a feature to be referred to by a user program editor or the like, range table for input data 34 which defines an effective range of input data, range table for output data 35 which defines an effective range of output data, and range table for return value 36 which defines a return value of a feature.

The structure of feature definition block 31 is not limited to that described above, and feature definition block 31 may have any other structure depending upon object processing.

When a user adds feature program 6 in order to add functions, by adding feature definition block 31 to feature definition file 2, the functions can be added without changing the program.

Figure 4:
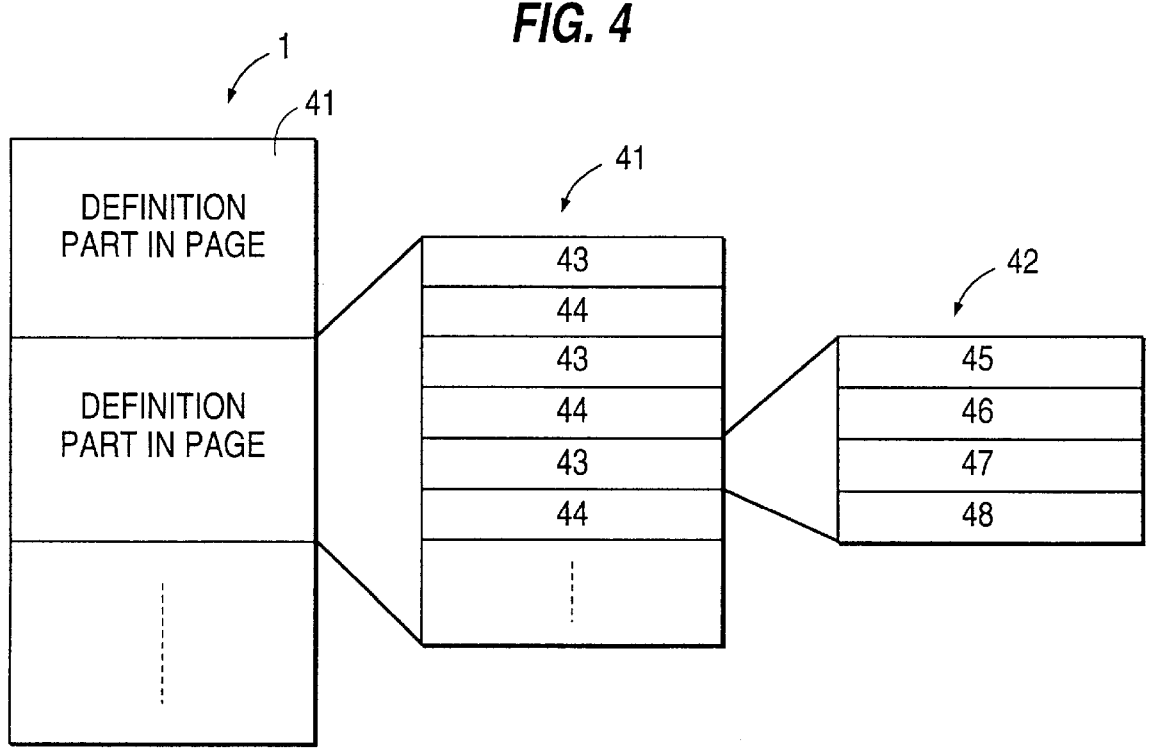
FIG. 4 is a diagrammatic view showing the structure of a program structure definition file shown in FIG. 1.

FIG. 4 is a diagrammatic view showing the structure of the program structure definition file shown in FIG. 1. Program structure definition file 1 shown in FIG. 4 has a plurality of definition parts in page 41 and a plurality of feature definition parts 42. Program structure definition file 1 is produced by a user using an editor. In the present embodiment, program structure definition file 1 is produced using an editor which employs a graphical user interface. Further, program structure definition file 1 is constructed in units of a page displayed by the graphic editor and is described by a combination of definition parts in page 41 for each page. Definition part in page 41 has figure types 43 and display coordinates of figures in page 44. Some of figure types 43 have feature definition part 42. Further, feature definition part 42 includes feature name 45, input parameter 46, output parameter 47, and figure number for next execution 48.

The structure of program structure definition file 1 is not limited to that described above, and program structure definition file 1 may have any other structure depending upon object processing or difference in editor used.

Further, even when feature program 6 is added in order to add functions, since program structure definition file 1 is produced based on feature name 45, program structure definition file 1 need not be modified in feature definition part 42 that does not require added feature program 6.

Figure 5:
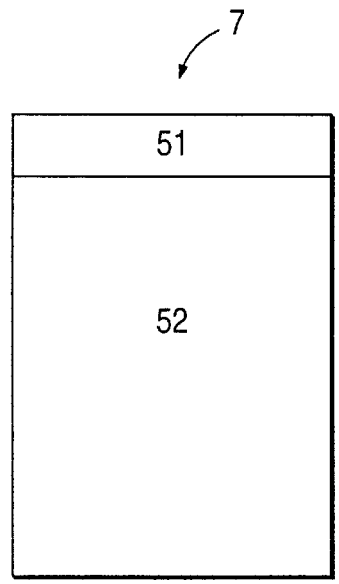
FIG. 5 is a diagrammatic view showing the structure of the driving database structure definition file shown in FIG. 1.

FIG. 5 is a diagrammatic view showing the structure of the driving database structure definition file shown in FIG. 1. Driving database structure definition file 7 shown in FIG. 5 has conditional part 51 and detail part 52. Conditional part 51 has information limiting the structure of driving database 4. Detail part 52 has a plurality of records indicative of the table structure of driving database 4, and each record has a column name and an attribute and a size of the column name. However, the plurality of records are not independent of each other but are united as detail part 52.

Figure 6:
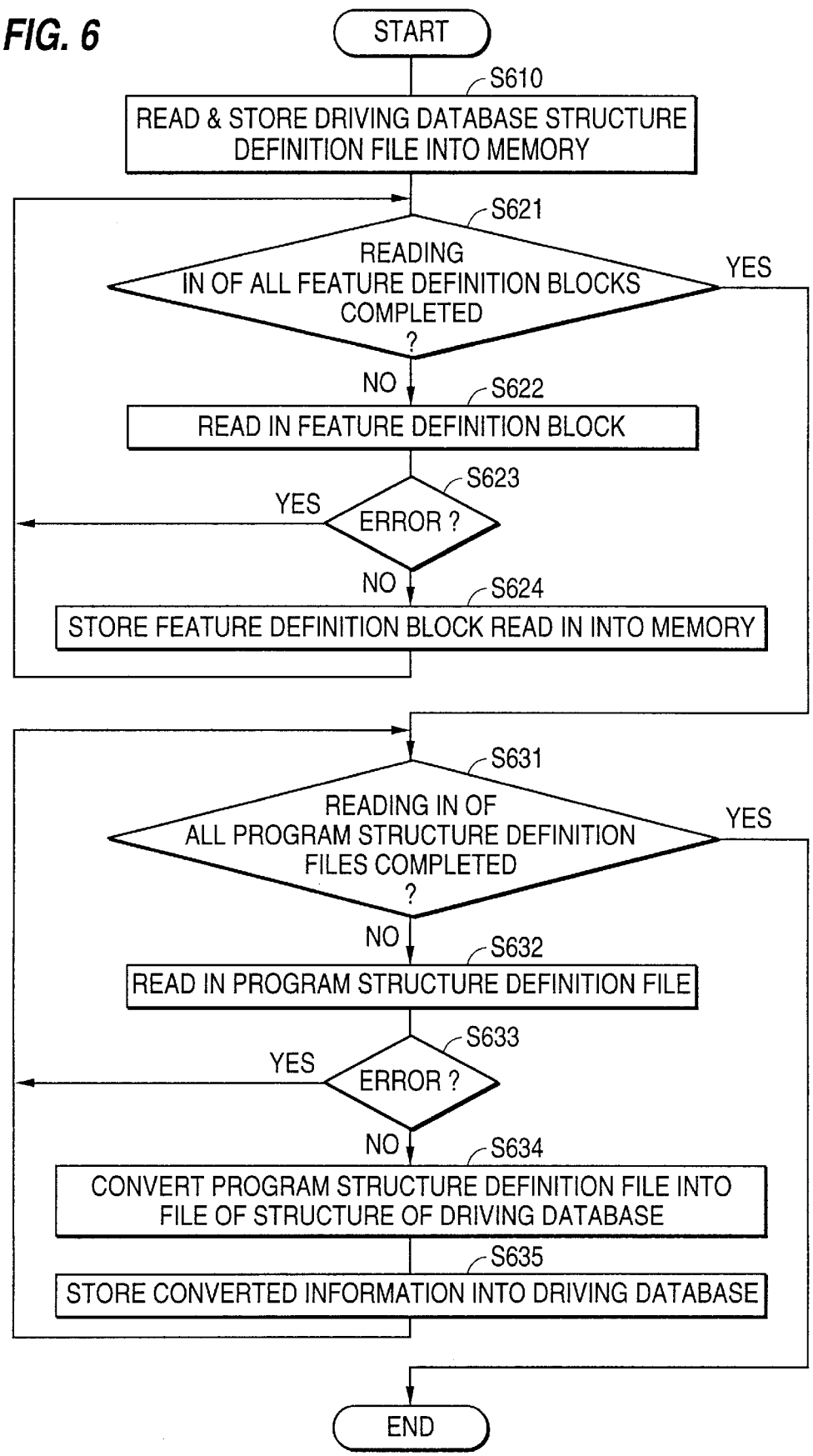
FIG. 6 is a flow chart illustrating automatic program production processing in the present embodiment.

FIG. 6 is a flow chart illustrating automatic program production processing in the present embodiment. The automatic program production processing in FIG. 1 will be described below with reference to FIG. 6.

By way of outline of processing, driving database structure definition file 7 is inputted to conversion program 3 (step 610; hereinafter referred to as S610), and feature definition block 31 of feature definition file 2 is inputted to conversion program 3, where processing is executed (S621 to S624), thereafter program structure definition file 1 is inputted to conversion program 3 and converted into a file of the structure of driving database 4 and then stored into the driving database 4 (S631 to S635).

Details of the processing will be described. When a program is started, processing is started. First, driving database structure definition file 7 is inputted to conversion program 3 and read and stored into a memory of a computer (not shown) on which conversion program 3 is to be executed (S610).

Then, it is determined whether or not all feature definition blocks 31 have been inputted to conversion program 3 and read into the memory of the above-mentioned computer on which conversion program 3 is to be executed (S621). If there is some feature definition block 31 for which reading in has not yet been completed, then it is read in (S622). It is determined whether or not the feature definition block 31 read in has a feature structure corresponding to the structure of driving database structure definition file 7 read in at S610 (S623). If an error is detected, then the process sequence returns to S621 in order to read in next feature definition block 31. An error may mean, for example, that the number of input parameters of feature definition block 31 is excessively large.

If no error is detected in S623, feature definition block 31 read in is stored into the memory of the computer on which conversion program 3 is to be executed (S624), and then the process sequence returns to S621 in order to read in next feature definition block 31.

If it is determined in S621 that reading in of all feature definition blocks 31 has been completed, then it is determined whether or not all program structure definition files 1 are inputted to conversion program 3 and read into the memory of the above-mentioned computer on which conversion program 3 is to be executed (S631). If some program structure definition file 1 for which reading in has not yet been completed, then reading in of program structure definition file 1 is performed (S632). It is determined whether or not the program structure definition file 1 read in meets the conditions of feature definition file 2 read in at S622 (S633). If an error is detected, then the process sequence returns to S631 in order to continue the reading in of next program structure definition file 1.

If no error is detected in S633, program structure definition file 1 is converted into a file of the structure of driving database 4 (S634). Converted information is stored into driving database 4 (S635), and the process sequence returns to S631 in order to read in the next program structure definition file 1.

If it is determined in S631 that reading in of all program structure definition files 1 has been completed, the processing is ended.

It is to be understood that although the characteristics and advantages of the present invention have been set forth in the foregoing description, the disclosure is illustrative only, and changes may be made in the shape, size, and arrangement of the parts within the scope of the appended claims.

What is claimed is:

1. A database driven automatic program production system having a driving database, a feature program, and a call processing program, comprising:

a file defining a driving database structure;

another file defining a program structure;

a further file defining a feature to be described in said driving database; and a conversion program that produces contents of said driving database, wherein a computer program is executed by driving said driving database, and wherein said conversion program receives as inputs thereto said file defining the driving database structure, said file defining the program structure, and said file defining the feature.

2. A database driven automatic program production system as claimed in claim 1, wherein, when contents of said driving database are to be changed, contents of at least one of said conversion program and said file which defines the feature are changed, and said driving database and said file which defines the program structure have a relationship wherein they are independent of each other.

3. A method for producing contents of a driving database in a system that includes a driving database structure definition file, a program structure definition file, a feature definition file, and a conversion program, comprising the steps of:

inputting the driving database structure definition file into the conversion program;

inputting the feature definition file into the conversion program;

inputting the program structure definition file into the conversion program;

producing the contents of the driving database using the conversion program based on the driving database structure definition file, the program structure definition file, and the feature definition file; and storing said contents of said driving database into a memory of a computer.

\* \* \* \* \*